Feb. 24, 1925.

1,527,912

E. B. PAUL

BELT CORE

Filed May 28, 1924

Earle B. Paul
INVENTOR

O. Thalmann

BY Victor J. Evans
ATTORNEY

WITNESS:

Patented Feb. 24, 1925.

1,527,912

UNITED STATES PATENT OFFICE.

EARLE BARRINGTON PAUL, OF SPRINGHILL, NOVA SCOTIA, CANADA.

BELT CORE.

Application filed May 28, 1924. Serial No. 716,527.

*To all whom it may concern:*

Be it known that I, EARLE BARRINGTON PAUL, a subject of the King of Great Britain, residing at Springhill, in the Province of Nova Scotia and Dominion of Canada, have invented new and useful Improvements in Belt Cores, of which the following is a specification.

This invention relates to a belt, the general object of the invention being to provide a belt with a metal core with means for fastening the ends of the core together, thus doing away with the lacing together of the belt ends which is liable to break and which causes an enlargement at the point of connection.

Another object of the invention is to provide a filler for covering the connected ends of the core after they have been connected together.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:—

Figure 1:
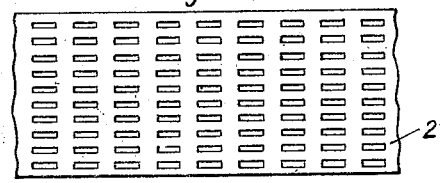
Figure 1 is a view of a portion of the core.
Figure 2:
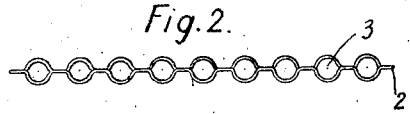
Figure 2 is an edge view of the core.
Figure 3:
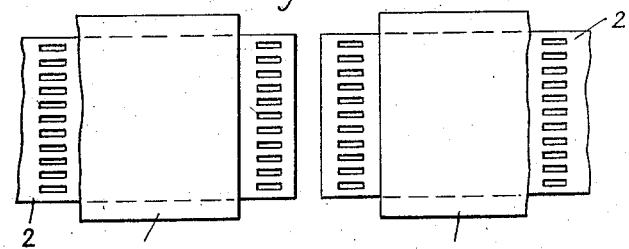
Figure 3 is a view showing the ends of the belt which are to be connected together with portions of the belt removed.
Figure 4:
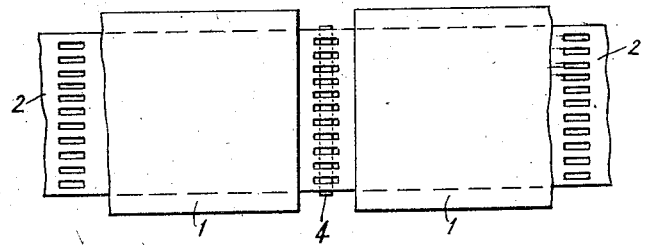
Figure 4 is a similar view but showing the core ends connected together.
Figure 5:
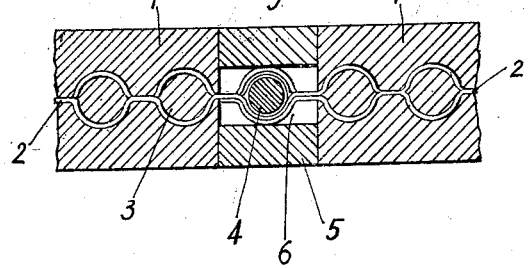
Figure 5 is a sectional view through the connected ends of the belt and showing the filler in place.
Figure 6:
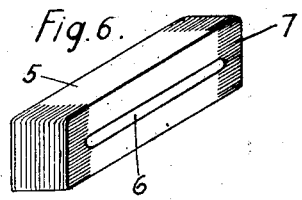
Figure 6 is a perspective view of the filler.

In these views, 1 indicates the belt and 2 the core thereof which is formed of a strip of metal which is provided with a plurality of pairs of slits, the metal between the slits being pressed outwardly in opposite directions to form the transversely extending circular openings 3. This construction of the core not only adds strength to the belt but it also provides means for fastening the ends of the belt together by overlapping the projecting ends of the core so that the transversely extending openings in one end will register with those in the other end to permit a pin 4 to be passed through them to connect the two ends of the core together. A filler block 5 having a slot 6 therein is then placed in the space between the ends of the belt to cover the connected ends of the core. The ends of this block are made of soft rubber as shown at 7 so that the block can be stretched and placed upon the belt when the ends of the core are to be connected together or separated. After the core has been connected the block is moved over the connected end to fill the space between the ends of the belt as shown in Figure 5.

From the above it will be seen that I have provided a belt of great strength, one that can be cheaply manufactured and one in which the disadvantages of lacing the ends together is eliminated and it offers an unbroken friction surface to the pulleys.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A belt of the class described having a metal core, said core being provided with a plurality of slits, the metal between the slits being pressed outwardly in opposite directions to form rows of transversely extending holes, the holes at the ends of the core receiving a pin to connect the ends of the belt together and a filler block for covering the connected ends of the core.

2. A belt of the class described having a metal core, said core being provided with a plurality of slits, the metal between the slits being pressed outwardly in opposite directions to form rows of transversely extending holes, the holes at the ends of the core receiving a pin to connect the ends of the belt together and a filler block for covering the connected ends of the core, said filler block having a slot therein and being formed of resilient material so that it can be stretched over the belt.

In testimony whereof I affix my signature.

EARLE BARRINGTON PAUL.